June 11, 1957  C. N. GOSNELL ET AL  2,795,009

PROCESS FOR PRODUCING SEALED ELECTRICAL MEMBERS

Filed May 11, 1951

WITNESSES:
Robert C. Baird
Wm. C. Groome

INVENTORS
Charles N. Gosnell &
Louis F. Deise.
BY
Frederick Shapoe
ATTORNEY

United States Patent Office 2,795,009

Patented June 11, 1957

2,795,009

PROCESS FOR PRODUCING SEALED ELECTRICAL MEMBERS

Charles N. Gosnell and Louis F. Deise, Baltimore, Md., assignors to Westinghouse Electric Corporation, East Pittsburgh, Pa., a corporation of Pennsylvania Application May 11, 1951, Serial No. 225,808

3 Claims. (Cl. 18—59)

This invention relates to electrical members that have been completely sealed or encapsulated in insulating materials.

For many applications, it is necessary that electrical members be protected by a completely enclosing, insulating structure. The use of metallic containers filled with a potting compound to contain the electrical members has been proposed heretofore but they entail the use of bushings and involve other accessories that not only greatly increase the cost of the insulated members but also unduly increase their weight and have other disadvantages.

The electrical industry has been desirous of some means for completely sealing or encapsulating electrical members with a relatively thin, exterior, form-fitting insulating coating associated with a substantially complete interior resinous impregnant so that there are no voids or spaces within the interior of the member so that moisture can not penetrate or collect therein and corona will not be generated in service. A lightweight, form-fitting capsule of resin would be most economical if such could be applied as a smooth continuous surface coating free from cracks and capable of withstanding the range of thermal expansion and contraction to be encountered in expected service, as well as the usual wear and tear to be met with during normal operations.

A problem particularly difficult to overcome has been the encapsulation of relatively complex members having numerous surface irregularities and relatively large apertures or recesses open at the surface, which recesses or apertures are difficult to bridge with an encapsulating coating of resin. When the dimensions across an aperture exceed one-tenth of an inch, a bridging coating of resin may be subject to such stresses during polymerization and hardening that cracking is difficult to prevent. Even a small crack in an encapsulating coating will permit the penetration of moisture to the interior and thereby will reduce the electrical resistance and may occasion failure of an electrical member in service. Other problems arise from the fact that some electrical members have relatively sharp projections as, for example, the coil leads which, when flexed accidentally or deliberately, may cause the cracking of the encapsulating coating of resin and consequent failure.

The present invention is directed to a process for preparing an encapsulated electrical member characterized by a smooth, void-free, relatively thin, form-fitting surface coating and an interior impregnation of resin completely filling all the space within the outer encapsulating coating.

Another object of the invention is to provide compositions for enabling the encapsulating of relatively complex members having relatively large apertures and surface irregularities.

A still further object of the invention is to provide encapsulated electrical members having smooth surfaces and characterized by a substantially void-free interior filling of insulating resins.

Other objects of the invention will in part be obvious and will in part appear hereinafter. For a better understanding of the nature and objects of the invention, reference should be had to the following detailed description and drawing, in which.

Figure 1:
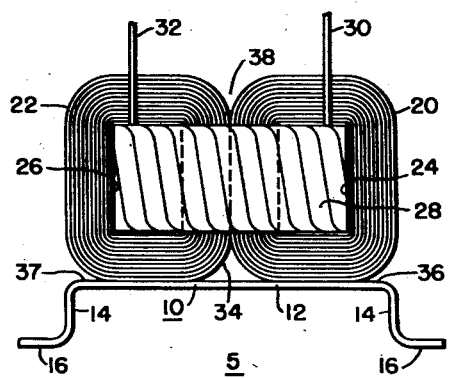
Figure 1 is a view in elevation of a transformer to be encapsulated.

Referring to Fig. 1 of the drawing, there is illustrated a transformer 5 suitable for electronic applications. The transformer 5 comprises a metal mounting bracket 10 composed of a base 12, vertical legs 14 and feet 16. Ordinarily, the feet 16 are provided with openings for the passage of mounting bolts or other fittings therethrough. Fastened to the base 12 of the mounting bracket 10 are magnetic cores 20 and 22, each composed of, for example, a wound strip of magnetic material which cores may have been prepared in accordance with well-known practice. One suitable wound core structure and process for the purpose of this invention is that set forth in Putman Patent No. 2,318,095. The core 20 is provided with a rectangular window 24 and the core 22 is provided with a rectangular window 26 and through both windows is passed a coil 28 linking the two cores together. Leads 30 and 32 extend outwardly from the coil 28. It should be understood that in practice there may be a considerable number of leads, for example four, six or more, extending from the coil 28. It will be evident that there are numerous spaces and apertures of substantial size present in the assembled transformer 5. Such spaces and apertures vary considerably from transformer to transformer due to the normal differences in size and shape of the parts. For example, a triangular space 34 exists between the cores 20, 22 and base 12. Wedge-shaped spaces 36 and 37 are present at the outside corners of the base 12 and the coils 20 and 22, respectively. A depression 38 is present at the upper juncture of the two cores. There is a space (not shown) at the interior of the coil 28 and at other places. The leads 30 and 32 are relatively thin and flexible and are unsupported. It is desirable to completely encapsulate the transformer into a smooth rounded structure, free from sharp corners and depressions, and to support the leads 30 and 32 in order to assure adequate life and satisfactory electrical properties to the apparatus in service.

In accordance with the present invention, the transformer 5 of Fig. 1 is initially treated to fill all apertures of a size exceeding 0.1 inch across, though it should be understood that surface openings smaller than this may be closed or slightly greater openings (say ⅛ inch) may be permitted to be present. Any sharp corners or unsupported projections are filleted. For the filling and filleting, we have found it necessary to employ a pasty composition of a texture similar to that of worked putty. Such a composition is readily applied by hand in a few seconds to the transformer 5 to fill all the apertures or surface openings and to fillet corners and to support any leads or other projecting portions of the electrical member.

The pasty composition that we have found to produce unique results is one consisting essentially of one part by volume of a fibrous insulating material, from 1 to 5 parts by volume of a finely divided inorganic solid, from 0.01 to 0.1 part by volume of a hardenable resinous binder, and sufficient volatile solvent to render the mixture pasty so that it may be manually applied or shaped without slumping or running off. Ordinarily from 1 to 3 parts by volume of a volatile organic liquid that is a solvent for the resinous binder is adequate to prepare a pasty composition. For the fibrous insulating material, it is preferred to employ shredded asbestos fibers or chopped glass fibers or mixtures of these. For the finely divided inorganic solid, the best results have been secured by the use of diatomaceous silica or a powdered silica aerogel. Numerous hardenable resinous materials may be employed. We have secured good results with cellulosic esters and ethers such for example as cellulose acetate, cellulose acetate-butyrate, ethyl cellulose and cellulose propionate. Furthermore, polyvinyl acetate, polyvinyl butyral, alkyd resins such as glycerol phthalate and glycol maleate resins and the like may be employed. Mixtures of two or more resinous binders may be used. The essential requirement for the composition is that there be a sufficiently small amount of the resin binder in the pasty composition so that when the volatile solvent is driven off, as by heating, the binder will harden and produce a relatively porous mass of material that will withstand some handling without breaking up or powdering. In some cases, the pasty composition may be air dried whereupon the volatile organic solvent evaporates and the resin, such as polyvinyl acetate hardens. It is necessary that the mass of the composition in the hardened state be sufficiently porous to be capable of being impregnated by a fluid resinous composition.

Figure 2:
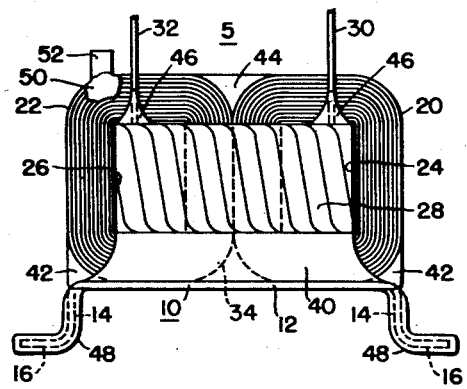
Fig. 2 is a view in elevation of the first stage of treating the transformer of Fig. 1 in accordance with the invention.

As illustrated in Fig. 2 of the drawing, the transformer 5 has been treated with the pasty composition to provide a filleting mass 40 between the base 10 and the coil 28 so as to fill the space 34 and to round off all of the sharp corners. A plug 42 of the pasty composition is applied at each of the outside corners between the base 10 and the cores 20 and 22. Similarly, a plug 44 is applied at the upper part to fill the V-shaped space between the cores 20 and 22. A supporting body 46 of the pasty composition is applied about each of the leads 40 and 42 to support and re-enforce them. Other parts having apertures therein are similarly plugged or filled or filleted with the pasty composition to round off the corners of the transformer and to render a relatively smooth uniform surface.

Inasmuch as the legs 14 and the feet 16 provide for rigidly mounting the transformer 5 upon a panel or other member, it is ordinarily desirable that they be not coated with appreciable thickness of resin. Therefore, a layer of a masking compound 48 that is readily strippable from the metal is applied thereto to prevent adhesion of subsequently applied resin. We have successfully employed as a masking composition, a 15% by weight solution of cellulose acetate in acetone, with 5% by weight of a plasticizer, such as dimethyl phthalate or propionin, present in the solution. However, mixtures of ethyl cellulose and mineral oil, or other strippable resinous compositions may be employed as masking compounds as is well known. A thin film of polytetrafluoroethylene or a coating of dimethyl silicone fluid may be applied to the metal to prevent adhesion of subsequently applied resin thereto.

At the upper part of the transformer at a point having interstices or fine passages opening at the surface and leading to the furthest portions of the cores and coil, there is applied a strip 52 of a suitable elastomer or resin which may be held in place with a wad 50 of the paste-like composition. The strip 52 may be composed of neoprene rubber, silicone rubber, polytetrafluoroethylene or cellulose acetate, for example.

The treated transformer is preferably dried and heat treated to evaporate the solvent from the applied masses of pasty composition 40—42—44—46 and 50 thereby to harden the binder, thereby leaving these masses in a hardened state but quite porous. The transformer 5 may be heated in an oven for one or more hours at a temperature of 135° C. Preliminary air drying has given good results. The oven temperatures may vary from 80° C. to 175° C. and the time varied inversely with the temperature.

The transformer 5, so initially treated and oven dried, as shown in Fig. 2 of the drawing, is in condition to be provided with an exterior enveloping coating or capsule of a relatively thick resinous composition. It is desirable to employ for this purpose a thermosettable resinous composition containing a high percentage of a finely divided solid filler, particularly mica. The viscosity and other properties of this coating should be such that it will not penetrate any distance into cavities or recesses that are less than about one-tenth inch across, and such coating will not penetrate into the coil or between the laminations of the core. However, such a composition will form a smooth, round, contoured surface coating upon the entire exterior of the transformer.

A suitable encapsulating coating should comprise a liquid completely reactive resinous composition associated with a high percentage of finely divided mica to render it thick enough to function as herein set forth. Examples of satisfactory compositions are those in the following examples.

*Example No. 1*

A mixture of:

| | Parts by weight |
|---|---|
| Castor oil | 100 |
| Maleic anhydride | 30 | was reacted to a polyester by heating the mixture at 120° C. for several hours to produce a castor oil-maleate of a molasses-like consistency. About 60 parts by weight of the cooled castor oil-maleate was dissolved in 30 parts by weight of monomeric styrene plus 0.02% of hydroquinone to inhibit premature polymerization. A resinous solution of the consistency of thin oil was so produced. In order to enhance the thixotropic properties of the solution, 65 parts by weight of the solution was admixed in an evacuated flask with 35 parts by weight of mica passing through a sieve having 325 meshes per lineal inch. Later 1% of benzoyl peroxide catalyst, based on the weight of the resinous components, was added to enable the composition to polymerize completely. A thick, golden-brown resinous material resulted which on heating reacted to a thermoset solid.

*Example No. 2*

A mixture of:

| | Parts by weight |
|---|---|
| Linseed oil | 61 |
| Castor oil | 15.8 |
| Maleic anhydride | 23.2 | was converted into polyester by heating the mixture for eight hours at 175° C. to 200° C. 75 parts of this polyester resin were dissolved in 25 parts of monomeric styrene and 0.03% hydroquinone inhibitor and 1% by weight of benzoyl peroxide catalyst was added to enable the mixture to polymerize upon heating.

When the resinous material is for coating or encapsulating some member such as the transformer 5, powdered mica may be incorporated in the resin solution in an evacuated flask in the proportion of 35 parts of mica to 65 parts of the solution. In employing the catalyzed resinous material, a transformer unit was dipped therein and baked several hours at 130° C. The resulting cured thermoset coating was substantially uniform in thickness and bridged all the gaps in the transformer cores and coil. The cured coating was softer and more flexible than that described in Example 1, but exhibited a tough, oxidized surface skin.

*Example No. 3*

A mixture of:

| | Parts by weight |
|---|---|
| Castor oil | 20 |
| Linseed oil | 60 |
| Peanut oil | 20 |
| Maleic anhydride | 30 | was heated at a temperature of 175° C. for eight hours until a thick sirupy polyester product resulted. 70 parts of the reaction product was dissolved in 30 parts by weight of monostyrene and 1% benzoyl peroxide was added. Then 60 parts by weight of the resin and 40 parts by weight of 325 mesh mica dust were combined by stirring in an evacuated flask. A thixotropic resinous material was produced that gave coatings similar to those described in Examples 1 and 2. The presence of the peanut oil prevented undue oxidation of the surface as compared to that produced on the linseed oil-castor oil-maleate resin of Example No. 2. The proportion of peanut oil may be increased or decreased to meet requirements.

Drying oils such as perilla oil, soybean oil, cotton-seed oil, corn oil, cashew nut shell oil and the like may be used to replace all or part of the linseed oil of Example 2. The proportion of castor oil to linseed oil or other drying oil may be modified to provide for different degrees of oxidation of the outer surface depending on conditions to be met. Various non-drying oils may replace all or part of the peanut oil.

More generally, numerous other completely reactive compositions may be employed for the purpose of forming encapsulating outer coatings on the transformer. The fluid resinous composition may comprise a single polymerizable component, such, for example, as diallyl phthalate, diallyl succinate, diallyl maleate, diallyl adipate, allyl alcohol, methallyl acrylate, diallyl ether, allyl acrylate, and allyl crotonate. It will be noted that such compositions comprise at least one unsaturated group >C=C< capable of vinyl-type polymerization. The best results have been secured with monomers containing two or more of these unsaturated groups capable of polymerization upon being subjected to heat. It will be understool that mixtures of any two or more of the polymerizable monomers may be employed. Numerous other multi-component, completely-reactive compositions are known to the art. Such compositions include, in many cases, an unsaturated resinous component—particularly an unsaturated alkyd resin—and an unsaturated polymerizable liquid monomer.

Particularly good results have been secured by employing as the resinous alkyd resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a polyhydric alcohol such as glycol, glycerol, or pentaerythritol or mixtures thereof. Castor oil has been employed successfully in reactions with maleic anhydride, and the resultant castor oil maleate ester admixed with a polymerizable unsaturated monomer, for example, monostyrene, in the proportions of from 10 to 95 parts by weight of the monostyrene and from 90 to 5 parts by weight of the ester. In the preparation of the unsaturated alkyd esters, the unsaturated alpha-beta dicarboxylic acid or anhydride may be replaced with up to 90% of the weight thereof of a saturated aliphatic dicarboxlic acid or aryl dicarboxylic acid or anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols—particularly in reaction with dicarboxylic acids instead of their anhydrides.

The alkyd esters may be dissolved in a liquid unsaturated monomer having the group $H_2C=C<$. Suitable liquid unsaturated polymerizable monomers are: monostyrene, alpha methyl styrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene and divinyl benzene, or mixtures of two or more of any of these monomers.

For use in the preparation of surface coatings large amounts of a solid filler such as finely divided mica are included in the completely reactive compositions. From 20% to 100%, based on the weight of the resinous ingredients, of mica may be added. The mica may be incorporated most readily by admixing under a vacuum. Other methods of incorporation are feasible. In some cases fibrous materials such as shredded asbestos or chopped glass fibers not over ⅛ inch in length may be included up to 10% of the weight of the resin, but we prefer to use mica without any other solid. Dyes may be included in the composition.

The completely reactive compositions may be polymerized by including therein a small amount, for instance 0.2 to 0.5%, based on the weight of the polymerizable components, of a suitable catalyst as for example benzoyl peroxide, lauroyl peroxide, acetyl peroxide, ascaridole, tertiary-butyl hydroperoxide and the like. To enable storage and to prevent room temperature polymerization a small amount of an inhibitor such as hydroquinone, tannin, phenolics and benzaldehyde is added. An amount of inhibitor equal to from 0.01% to 0.1% of the weight of the resinous components is sufficient.

When catalyzed, the applied compositions polymerize readily when heated to temperatures of the order of 100° C. to 150° C. The compositions do not give off any moisture or other volatile by-products and shrink but slightly.

Figure 3:
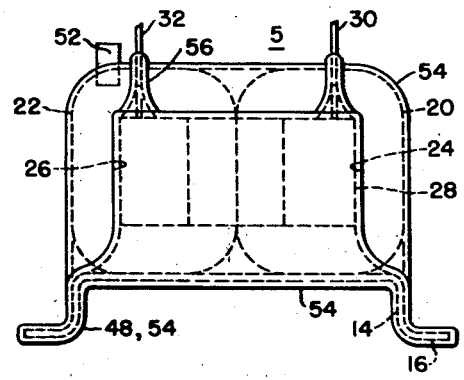
Fig. 3 is a view in elevation showing the application of an outer encapsulating coating to the treated transformer of Fig. 2.

After having been cured by baking, the encapsulated transformer 5 has the appearance as shown in Fig. 3 of the drawing, wherein a smooth exterior coating 54 of uniform thickness is present about the entire transformer except for the legs 14. The leads 30—32 are covered and protected a substantial distance by the layer 56 of the encapsulating resin. However, the interior of the coil and cores is unimpregnated.

In order to fill the interior of the coil 28 and cores 20 and 22, the strip 52 is withdrawn thereby producing an opening extending through the coating 54 and leading to the interstices in core 22. These interstices lead to interstices in the coil 28 which, in turn, connect to interstices in the coil 20. It should be understood that several strips such as 52 may be used and withdrawn thereby leaving a plurality of openings at the upper part of the electrical member.

The encapsulated unit shown in Fig. 3 of the drawing is then placed in an evacuable container and subjected to a vacuum of at least five inches of mercury absolute pressure. The opening 60 left when the elastomer strip 52 is removed should be maintained uppermost. When the desired vacuum is attained, there is introduced into the container a completely reactive fluid composition of such a viscosity that it will readily penetrate into the interstices within the interior of the transformer and fill all of the space within the coating 54. This composition should be applied in an amount to cover the entire transformer by at least one-quarter of an inch. If desired, after the transformer has been completely immersed for a few minutes, normal atmospheric pressure may be applied to the surface of the composition in order to force the composition into the interstices. The vacuum impregnation may be repeated a number of times in order to insure the most thorough impregnation possible.

Figure 4:
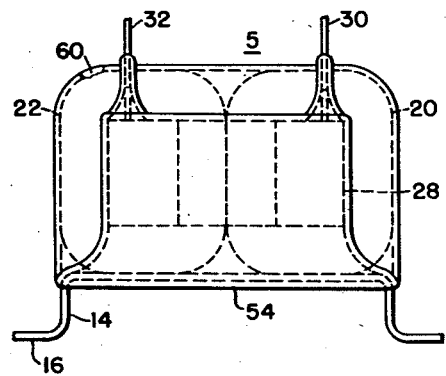
Fig. 4 is a view in elevation of a completely encapsulated and impregnated transformer.

After such impregnation, the transformer should be carefully removed from the container in its upright position so that the opening left by strip 52 is uppermost, and heated until the completely reactive composition polymerizes into a solid. The transformer may be re-impregnated at least once in a similar manner in order to fill any shrinkage spaces that may have been left by the polymerization of the first impregnation of resin, or in case a fault in coating 54 has allowed resin to escape during the first impregnation. The second batch of impregnating resin is similarly polymerized. After the second or later impregnation of resin has been completely polymerized, there is produced a completely sealed encapsulated unit as shown in Fig. 4 of the drawing. The masking composition 48 is removed from the feet and legs of the supporting bracket to expose the bare metal. It will be noted that the leads 30 and 32 of the transformer are well supported and failure of the insulation at the leads is thereby minimized. There will be present no cracks or surface openings or other defects as would be possible if the transformer were not initially treated to produce fillets and the like as illustrated in Fig. 2 of the drawing.

The completely reactive composition employed for the impregnation of the interior of the cores and coils may be the compositions disclosed hereinbefore for the outer coating without the addition of any mica or other filler. The use of a somewhat higher percentage of a polymerizable monomer in the composition of Example 1, for instance, will reduce the viscosity of the composition to the point that it will readily penetrate into the finest interstices. We have secured particularly good success with completely reactive compositions having a viscosity of from 30 to 50 seconds, as determined by a Demmler No. 1 cup. These fluid polymerizable compositions have been found to thoroughly saturate the hardened masses of the original pasty composition 40—42—44—46 etc., and to fill all of the interstices thereof. After being polymerized, the fillets and the like are extremely rigid and shock resistant.

It should be understood that while only a single coating 54 has been illustrated as having been applied to the exterior of the transformer, two or more coatings may be applied depending on what thickness of insulation is required and also upon the size and shape of the apparatus being treated. Furthermore, while the drawing illustrates the use of a single coating 54, there may be applied two overlapping coatings as disclosed in Hill et al. Patent 2,414,525. However, the use of a single completely covering coating 54 in association with a removable strip 52 has been found to be more economical.

While the invention has been explained in detail with relation to a transformer, it should be understood that numerous other types of electrical apparatus may be similarly treated. For example, field coils, solenoid coils, and the like may be similarly treated to produce members having exceptional ability to withstand moisture, the effects of the elements and with substantially no interior corona.

Since certain changes may be made in the above invention and different embodiments of the invention may be made without departing from the scope thereof, it is intended that all matter contained in the above described disclosure shall be interpreted as illustrative and not in a limiting sense.

We claim as our invention:

1. In the process of preparing an encapsulated electrical member, the electrical member comprising an electrical conductor with solid insulation applied thereto, the electrical member having irregular surfaces, and relatively large apertures and recesses open at the exterior surfaces of the member, the steps comprising closing the apertures and recesses with a pasty composition so as to leave exposed no surface openings greater than about 0.1 inch across, applying a fillet of the pasty composition about any projections and sharp corners whereby to produce a smoother, more rounded surface on the electrical member, the pasty composition comprising essentially one part by volume of a fibrous insulating material, from one to five parts by volume of a finely divided inorganic solid, from 0.01 to 0.1 part by volume of a hardenable resinous binder, and sufficient volatile solvent to render the mixture pasty so that it may be manually applied without running off, the pasty composition hardening to a porous mass when heated, heating the electrical member and the applied pasty composition to drive off the organic solvent and to leave the composition in a hardened, porous state, applying a removable channel-forming member to the uppermost portion of the electrical member at a point where there are fine apertures leading to the interior of the electrical member, covering the entire outer surface of the electrical member with a completely reactive resinous composition of a viscosity to bridge all the fine apertures in the member without substantially penetrating into them, polymerizing the completely reactive composition to provide a complete covering about the electrical member, withdrawing the channel-forming member thereby leaving an opening through the covering, vacuum impregnating the covered electrical member through the opening with a second fluid completely reactive resinous composition of a viscosity whereby it penetrates and fills all the interior interstices of the electrical member and impregnates the hardened composition previously applied as a paste, and polymerizing the second resinous composition.

2. The process of claim 1, wherein the pasty composition is composed of one part by volume of asbestos fibers, from three to five parts by volume of diatomaceous silica, from 0.1 to 0.15 part by volume of a cellulosic resin and sufficient solvent to produce a paste therefrom.

3. In the process of encapsulating an electrical transformer comprising a core, a coil with leads projecting from the coil, and a base, with interstices, apertures and recesses of substantial size being present and with the surfaces being irregular, the steps comprising closing the apertures and recesses with a pasty composition so as to leave exposed no surface openings greater than about 0.1 inch across, applying a fillet of the pasty composition about any projections and sharp corners whereby to produce a smoother surface and building up supporting fillets about the leads, the pasty composition comprising essentially one part by volume of a fibrous insulating material, from one to five parts by volume of a finely divided inorganic solid, from 0.01 to 0.1 part by volume of a hardenable resinous binder, and sufficient volatile solvent to render the mixture pasty so that it may be manually applied without running off, the pasty composition hardening to a porous mass when heated, heating the electrical transformer and the applied pasty composition to drive off the organic solvent and to leave the composition in a hardened, porous state, applying a removable channel-forming member to the uppermost portion of the electrical transformer at a point where there are fine apertures leading to the interior of the electrical transformer, covering the entire outer surface of the electrical transformer with a completely reactive resinous composition of a viscosity to bridge all the fine apertures in the transformer without substantially penetrating into them, polymerizing the completely reactive composition to provide a complete covering about the electrical transformer, withdrawing the channel-forming member thereby leaving an opening through the covering, vacuum impregnating the covered electrical transformer through the opening with a second fluid completely reactive resinous composition of a viscosity whereby it penetrates and fills all the interior interstices of the electrical transformer and impregnates the hardened composition previously applied as a paste, and polymerizing the second resinous composition.

References Cited in the file of this patent

UNITED STATES PATENTS

| | | |
|---|---|---|
| 1,326,366 | Milton | Dec. 30, 1919 |
| 2,414,525 | Hill | Jan. 21, 1947 |
| 2,464,029 | Ehrman | Mar. 8, 1949 |
| 2,464,568 | Flynn | Mar. 15, 1949 |
| 2,471,500 | Stewart | May 31, 1949 |
| 2,484,215 | Foster | Oct. 11, 1949 |
| 2,511,436 | Kauth | June 13, 1950 |